United States Patent [19]

Lauf et al.

[11] Patent Number: 5,648,180
[45] Date of Patent: Jul. 15, 1997

[54] METHOD FOR JOINING CARBON-CARBON COMPOSITES TO METALS

[75] Inventors: Robert J. Lauf, Oak Ridge; April D. McMillan; Arthur J. Moorhead, both of Knoxville, all of Tenn.

[73] Assignee: Lockheed Martin Energy Systems, Inc., Oak Ridge, Tenn.

[21] Appl. No.: 620,509

[22] Filed: Mar. 22, 1996

[51] Int. Cl.[6] .............................. B32B 5/14; B32B 15/04; B23K 35/22

[52] U.S. Cl. ............................ 428/634; 228/124.1

[58] Field of Search ................ 428/634; 228/124.1, 228/203, 211, 903

[56] References Cited

U.S. PATENT DOCUMENTS

| | | | |
|---|---|---|---|
| 2,979,814 | 4/1961 | Steinberg | 228/124.1 |
| 3,713,790 | 1/1973 | Takamori et al. | 428/634 |
| 4,448,853 | 5/1984 | Fischer et al. | 428/607 |
| 4,731,298 | 3/1988 | Shindo et al. | 428/634 |
| 5,243,464 | 9/1993 | Lauf | 359/614 |
| 5,313,325 | 5/1994 | Lauf | 359/614 |

*Primary Examiner*—John Zimmerman
*Attorney, Agent, or Firm*—James M. Spicer

[57] ABSTRACT

A method for joining carbon-carbon composites to metals by brazing. Conventional brazing of recently developed carbon-bonded carbon fiber (CBCF) material to a metal substrate is limited by the tendency of the braze alloy to "wick" into the CBCF composite rather than to form a strong bond. The surface of the CBCF composite that is to be bonded is first sealed with a fairly dense carbonaceous layer achieved by any of several methods. The sealed surface is then brazed to the metal substrate by vacuum brazing with a Ti-Cu-Be alloy.

5 Claims, 1 Drawing Sheet

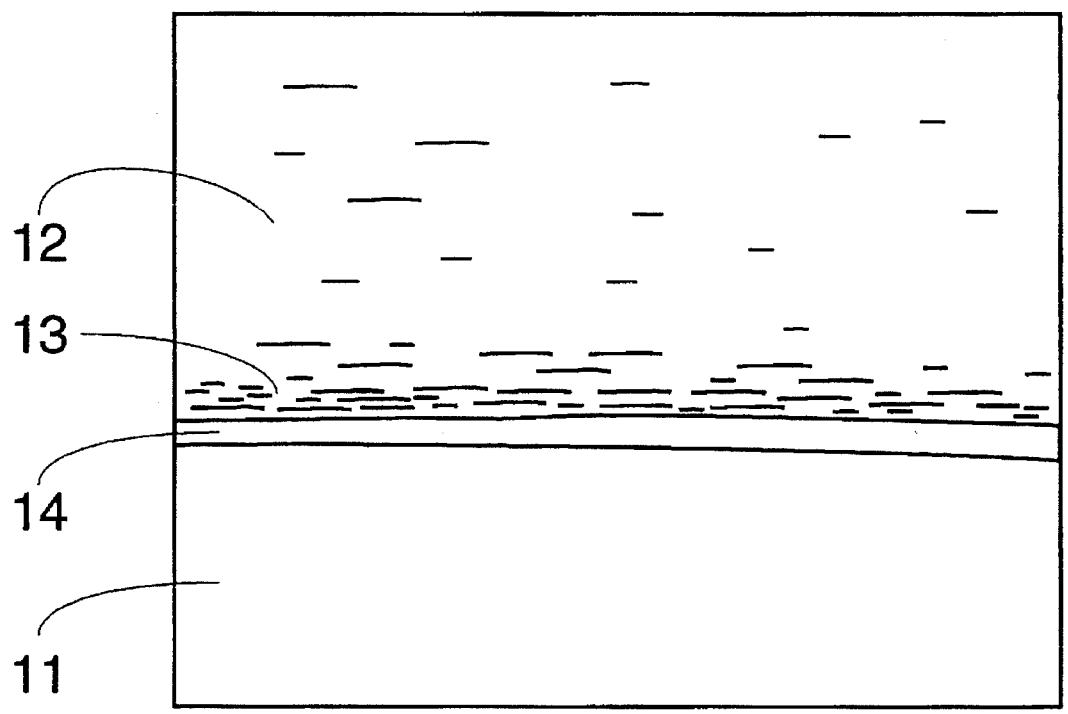

METHOD FOR JOINING CARBON-CARBON COMPOSITES TO METALS

This invention was made with Government support under contract DE-AC05-84OR21400 awarded by the Office of Energy Efficiency and Renewable Energy, U.S. Department of Energy to Lockheed Martin Energy Systems, Inc. The Government has certain rights in this invention.

FIELD OF THE INVENTION

The present invention relates to low-density carbon-bonded carbon fiber (CBCF) composite material and uses thereof, and more particularly to methods for brazing CBCF composite to metals, especially copper.

BACKGROUND OF THE INVENTION

Low-density carbon-bonded carbon fiber (CBCF) composite is a versatile material originally developed at the Oak Ridge National Laboratory for thermal insulation. It consists of randomly-oriented chopped carbon fibers bonded by glassy carbon such that the bulk density is typically 10% of theoretical density.

Two other applications for low-density CBCF composite were as a light absorbing article and as a light emitting article. (U.S. Pat. Nos. 5,243,464, issued Sep. 7, 1993; and 5,313,325, issued May 17, 1994.) More recently, we have applied CBCF composite as a coating on the internal copper surfaces of microwave tubes resulting in improved tube performance (see our co-pending Application entitled "Improved Microwave Tube"). We have also produced shaped bodies of CBCF composite and applied them as attenuators (i.e., load elements) in microwave waveguides and coaxial transmission lines (our co-pending Application entitled "Improved Radio-Frequency and Microwave Load").

All of the above uses for CBCF composites (i.e., optical absorbers, optical emitters, microwave tube coatings, and microwave attenuators) would be enhanced if a suitable method for joining CBCF articles to metals, particularly copper, were available.

In our optical absorber patent, U.S. Pat. No. 5,243,464, we disclosed a method for directly bonding CBCF composite to carbonaceous material. As it turns out, the method is appropriate for a graphite substrate but not for attachment to metals such as copper because the high temperature required for the carbonization step is above the melting point of copper.

Organic adhesives are another candidate bonding method. Organic adhesives, however, are of limited value in applications that require a very clean article or use of high vacuum. High-vacuum systems such as microwave tubes and sensitive optical systems cannot tolerate components such as adhesives that outgas during service. Also, microwave waveguides and coaxial transmission lines require good thermal and electrical contact between the CBCF composite and the metal substrate they are attached to. Organic adhesives are not suitable for these purposes either.

We also tried vacuum brazing. Our attempts to use braze alloys to vacuum braze CBCF composite to copper and other metals lacked success because the molten braze alloy "wicked" into the CBCF composite rather than bond the CBCF composite to the metal substrate.

SUMMARY OF THE INVENTION

It is therefore an object of the present invention to provide a method for bonding low-density carbon-carbon composites to metals.

Another object is to provide a method for bonding low density CBCF composite to metals while maintaining good thermal and electrical contact between the CBCF composite and metal.

Another object is to provide a composite article of CBCF composite and metal that does not contain organic adhesives.

Still another object is to provide a vacuum brazing method for bonding low-density carbon-carbon composite articles to metal substrates.

In accordance with one aspect of the present invention, the foregoing and other objects are achieved by a method for making a composite article comprising the steps of fabricating a low-density carbon-carbon composite body to a desired size and shape, carbonizing a substantially dense carbon coating on at least one surface of the low-density carbon-carbon composite body to form a coated bond surface, fabricating a metal body of a desired size and shape, disposing a braze alloy between a selected surface of the metal body and coated bond surface of the carbon-carbon body, and heating the composite article above the melting temperature of the braze alloy.

In accordance with a second aspect of this invention, a composite article comprises a carbon composite body having a bulk density less than about 2 g/cc, the carbon composite body having at least one surface which is substantially fully dense; a metal body; and a brazed joint between the metal body and the substantially dense surface of the carbon composite body.

Further and other aspects of the present invention will become apparent from the description contained herein.

BRIEF DESCRIPTION OF THE DRAWING

The drawing is a cross-sectional diagram of a braze joint between a metal substrate and a CBCF composite article in which the braze surface of the CBCF composite has been sealed to prevent infiltration of the braze alloy.

DETAILED DESCRIPTION OF THE PREFERRED EMBODIMENT

The best mode contemplated of carrying out our invention is to perform the vacuum brazing of a low-density CBCF composite article to a metal substrate in two steps. In the following example, the method of bonding CBCF composite to copper is described.

In the first step, the surface of the CBCF article that is to be brazed is sealed. Sealing prevents infiltration of the braze alloy into the low-density body of the CBCF composite. The sealing step is carried out by coating the bond surface of the CBCF article with a carbonizable organic material (preferably pitch) and carbonizing the pitch in an inert atmosphere or vacuum to form a dense carbonaceous surface layer on the low-density CBCF composite body. Carbonization of the pitch can be carried out in vacuum at 1600° C.

The second step of the method is to vacuum braze the CBCF composite to the copper substrate using a suitable braze alloy such as Ti-Cu-Be. One particularly suitable alloy contains 49% Ti, 49% copper and 2% Be by weight.

In the brazing step, the braze alloy is made into a paste with a vehicle such as Nicrobraze cement Grade 500, a mixture of polymethyl methacrylate and solvent (Wall Colmonoy Corp., Detroit, Mich.). This is applied to the prepared copper substrate (prepared in this sense means that any oxide scale has been removed by sanding). Brazing is carried out in vacuum at 980° C. for 5 minutes. The resulting joint, illustrated in the drawing, is stronger than the bulk CBCF composite, indicating more than adequate bond strength. In the drawing, CBCF article 12 is shown with a dense carbonized layer 13 (the sealed braze surface) that prevents infiltration of the braze alloy 14. The layer 13 is the means by which the braze alloy 14 forms a strong bond between the copper substrate 11 and CBCF article 12.

The Ti-Cu-Be alloy is of such composition and melting temperature that the braze joint is not adversely affected by subsequent brazing operations undergone by the copper body. SEM analysis has confirmed that the dense carbonized layer successfully prevents infiltration of the braze into the CBCF composite.

The above-described joint is acceptably strong, and provides good electrical and thermal contact. The bonded article is free of organics, and does not outgas in service. These features make this braze joint ideally suited for use in our co-pending microwave tube and microwave attenuator patent applications entitled "Improved Microwave Tube" and "Improved Radio-Frequency and Microwave Load".

The method of this invention requires very little surface preparation, and lends itself to the fabrication of complex bodies owing to the easy machinability of CBCF composite. The brazing procedure is substantially the same as traditional brazing practice, and requires no modifications to existing equipment or procedures other than pointed out above.

The following are understood to be within the scope of the invention: Any carbon-carbon composite that is less than fully dense should be taken to be within the spirit of this disclosure. This includes both continuous-fiber and chopped-fiber composites, as well as carbon foams and other porous forms as are well known to those skilled in the art. (An example is reticulated vitreous carbon made by Energy Research and Generation, Inc., Oakland, Calif.).

Copper is the preferred substrate for the applications we are developing at present, but the invention is not limited to this one metal. The braze alloy (Ti-Cu-Be) will provide a strong braze joint on other metals such as steels, as well as on most ceramics if desired.

Other carbonizable organic materials that can be used for forming the dense bond surface layer include phenolic resin, cellulose and polyacrylonitrile. Alternatively, a dense layer of carbon may be deposited on the surface of the CBCF to be bonded by high-temperature pyrolysis of methane, as is well known in the art. Any appropriate braze alloy can be used, depending on the choice of substrate and the rest of the thermal cycle to which the article will be exposed. Our invention applies to soldering of CBCF composite to metals as well as brazing. In soldering, the CBCF composite undergoes the carbonization step described hereinabove, followed by the usual soldering step.

While there has been shown and described what are at present considered the preferred embodiments of the invention, it will be obvious to those skilled in the art that various changes and modifications can be made therein, without departing from the scope of the invention defined by the appended claims.

We claim:

1. A method for making a composite article comprising the steps of:

fabricating a low-density carbon-carbon composite body to a desired size and shape, said body having a density gradient within it such that one region of said body is less than fully dense and a selected surface region of said body is substantially fully dense;

fabricating a metal body of a desired size and shape;

disposing a braze alloy between a selected surface of said metal body and said substantially fully dense surface region of said composite body; and heating said composite article above the melting temperature of said braze alloy such that said alloy bonds said carbon-carbon composite body and said metal body together, said substantially fully dense surface region of said composite body preventing said alloy from being drawn into said less than fully dense region of said carbon-carbon composite body.

2. A composite article comprising:

a carbon-carbon composite body having a density gradient within it such that one region of said body is less than fully dense, and a selected surface region of said body is substantially fully dense;

a metal body; and a brazed joint between said metal body and said substantially fully dense surface region of said carbon-carbon composite body.

3. The composite article of claim 2 wherein said brazed joint is formed using a braze alloy of Ti-Cu-Be.

4. The method of claim 1 wherein said heating step is carried out in vacuum.

5. The article of claim 2 wherein said metal body is copper.

* * * * *